United States Patent

Lupke et al.

[11] Patent Number: 5,525,289
[45] Date of Patent: Jun. 11, 1996

[54] METHOD AND APPARATUS FOR COOLING HOLLOW MOLDED PRODUCT

[76] Inventors: Manfred A. A. Lupke, 92 Elgin Street, Thornhill, Ontario, Canada, L3T 1W6; Stefan A. Lupke, 32 Vintage Lane, Thornhill, Ontario, Canada, L3T 1X6

[21] Appl. No.: 380,689

[22] Filed: Jan. 30, 1995

[51] Int. Cl.$^6$ .................................................. B29C 47/88
[52] U.S. Cl. ................ 264/508; 264/568; 264/150; 264/237; 264/348; 425/72.1; 425/326.1; 425/336; 425/387.1; 425/396; 425/379.1
[58] Field of Search ...................... 264/508, 506, 264/507, 237, 348, 565–566, 568, 150–151; 425/326.1, 396, 393, 379.1, 72.1, 387.1, 532, 336

[56] References Cited

U.S. PATENT DOCUMENTS

| | | | |
|---|---|---|---|
| 3,574,806 | 4/1971 | Potter et al. | 425/72.1 |
| 3,618,169 | 11/1971 | Coast | 264/565 |
| 3,844,700 | 10/1974 | Sokolow | 425/396 |
| 4,145,387 | 3/1979 | Hegler et al. | 264/173 |
| 4,160,638 | 7/1979 | Kolossow | 425/387.1 |
| 4,396,567 | 8/1983 | Rainville | 264/538 |
| 4,528,832 | 7/1985 | Fuchs, Jr. | 264/565 |
| 4,545,751 | 10/1985 | Lupke | 264/508 |
| 4,710,337 | 12/1987 | Nordström | 264/508 |
| 5,139,730 | 8/1992 | Holso et al. | 264/508 |
| 5,296,188 | 3/1994 | Lupke | 264/508 |

FOREIGN PATENT DOCUMENTS

| | | | |
|---|---|---|---|
| 2015921 | 10/1971 | Germany | 264/150 |
| 1157558 | 7/1969 | United Kingdom | 264/508 |

*Primary Examiner*—Jeffery R. Thurlow

[57] ABSTRACT

In a method of forming a hollow product in a molding apparatus having an upstream and a downsteam end a parison of thermoplastic material is extruded in a molten state from a heated extruder at the upstream end and moved through a product shaping region towards the downstream end of the apparatus. The material is cooled by passing a cooling medium internally of the product from the downstream end towards the upstream end of the apparatus.

21 Claims, 5 Drawing Sheets

METHOD AND APPARATUS FOR COOLING HOLLOW MOLDED PRODUCT

FIELD OF THE INVENTION

The present invention relates to a method of cooling a hollow profile molding apparatus.

BACKGROUND OF THE INVENTION

In a conventional extrusion mold such as a hollow pipe molding apparatus thermoplastic material is extruded from a die into a pipe forming tunnel. The material initially in a molten state is cooled as it moves along the tunnel to provide a shaped pipe wall which emerges from the molding apparatus. The faster the material can be cooled, the higher the production rate.

If the material is only cooled from the outside of the molding apparatus, this creates very detrimental stress on the pipe. Therefore, there have been developments made with respect to cooling the material from inside the molding apparatus.

According to a known method, cooling air is drawn in from the upstream end of the mold through the die head and forced to move downstream with and cool the thermoplastic material. This method does however have some drawbacks. The air at its coldest temperature runs through and detrimentally cools the die and die tooling itself. Furthermore, by the time the cooling air reaches the mold tunnel where it is desirable to have the greatest effect on the pipe wall forming material it has lost much of its cooling capacity to the upstream tooling.

In a conventional internally cooled pipe mold used in forming single wall pipe, the pipe wall as it is released from the downstream end of the mold tends to reheat because the supposed cooling air has given up much of its ability to cool at the upstream end in the area of the die tooling. This leaves heat trapped in the pipe wall and reduces output speeds from the mold. The pipe itself when leaving the mold at an overly warm temperature coils rather than being straight as is desired. Once the pipe has coiled, the memory of the material holds the non-wanted coiled shape. Furthermore, it is very difficult to perforate the pipe wall when the thermoplastic material is warm rather than having been properly cooled and set.

SUMMARY OF THE INVENTION

The present invention relates to a method of forming a hollow product in a molding apparatus in which the cooling of the thermoplastic material is achieved in a manner to overcome the difficulties mentioned above. In particular, according to the method of the present invention, a hollow product or profile is formed in a molding apparatus having an upstream and a downstream end. The method comprises extruding a parison of thermoplastics material in a molten state from a heated extruder at the upstream end and moving the material through a product shaping region towards the downstream end of the apparatus. The material is cooled by passing a cooling medium from the downstream end towards the upstream end opposite to the direction of flow of the material through the molding apparatus.

The cooling medium may be in the form of ambient air, cooled air, a combination of ambient and cooled air or even a cooling liquid. Furthermore, the method is applicable to different types of hollow products such as hollow pipe and the like.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
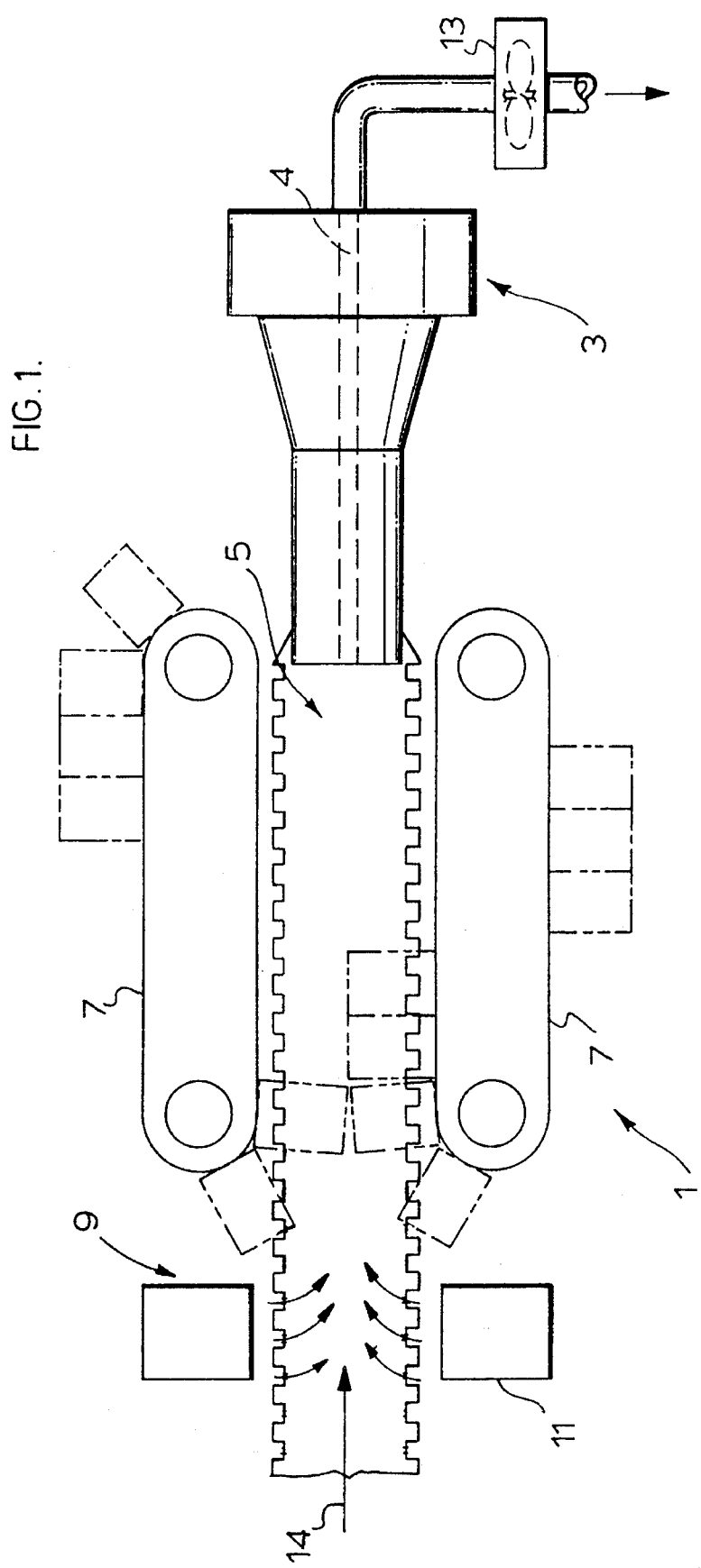
FIG. 1 is a general view of a molding apparatus with cooling features for making a pipe in accordance with a preferred embodiment of the present invention.

FIG. 1 shows a molding apparatus generally indicated at 1. This molding apparatus is used in the formation of pipe P made from a thermoplastics material with such material being known to those skilled in the art.

Molding apparatus 1 includes an upstream end provided with a die 3. When the molding apparatus is in use, die 3 is heated to extrude a parison of the thermoplastic material in a molten state into a mold tunnel 5 where the wall of the pipe is shaped. In this particular case, the mold tunnel is defined by opposing tracks 7, each of which carries moving mold block sections which meet with one another along the mold tunnel to form the pipe. The mold block sections on the opposing tracks then separate from one another at the end of the mold tunnel 9 towards the downstream end of the mold apparatus. In the particular set up as shown in FIG. 1, perforator 11 is also provided to provide perforations in the pipe wall after it leaves the mold tunnel.

In accordance with the general concept of the present invention, cooling gas as shown by the arrows generally indicated at 14 is drawn from the downstream end back up towards the upstream end of molding apparatus 1. In the particular case shown in FIG. 1 die 3 is on the negative pressure side of a blower 13 which draws the cooling gas 14 through a passage 4 provided in the die. This passage communicates through the pipe itself to the cooling gas supply which may either be ambient air from outside of the molding apparatus which is at a substantially reduced temperature in comparison to the internal working temperatures of the apparatus or it may be gas e.g. air drawn in from some type of a cooler. It may also be a combination of outside ambient air and cooled air.

In the particular arrangement shown in FIG. 1, the cooling gas may be drawn in through the end of the pipe which is open as it leaves the molding apparatus and may also be drawn in through the perforations provided by perforator 11.

FIG. 2 again shows molding apparatus 1 having an upstream die 3 and tracks 7 which carry moving mold block sections to define a mold tunnel 5 downstream of the die 3. However, in this case, the perforator 11 from FIG. 1 has been replaced with a perforator 12 which acts in combination with a cooling chamber 15 to provide cooled air indicated by arrows 16 at the downstream end of the molding apparatus. This cooling air is moved in the upstream direction against the flow of thermoplastic material in the molding apparatus by both the negative pressure created by blower 13 through passage 4 in die 3 as well as by an additional blower 17 providing positive air pressure at perforator 12.

Figure 2:
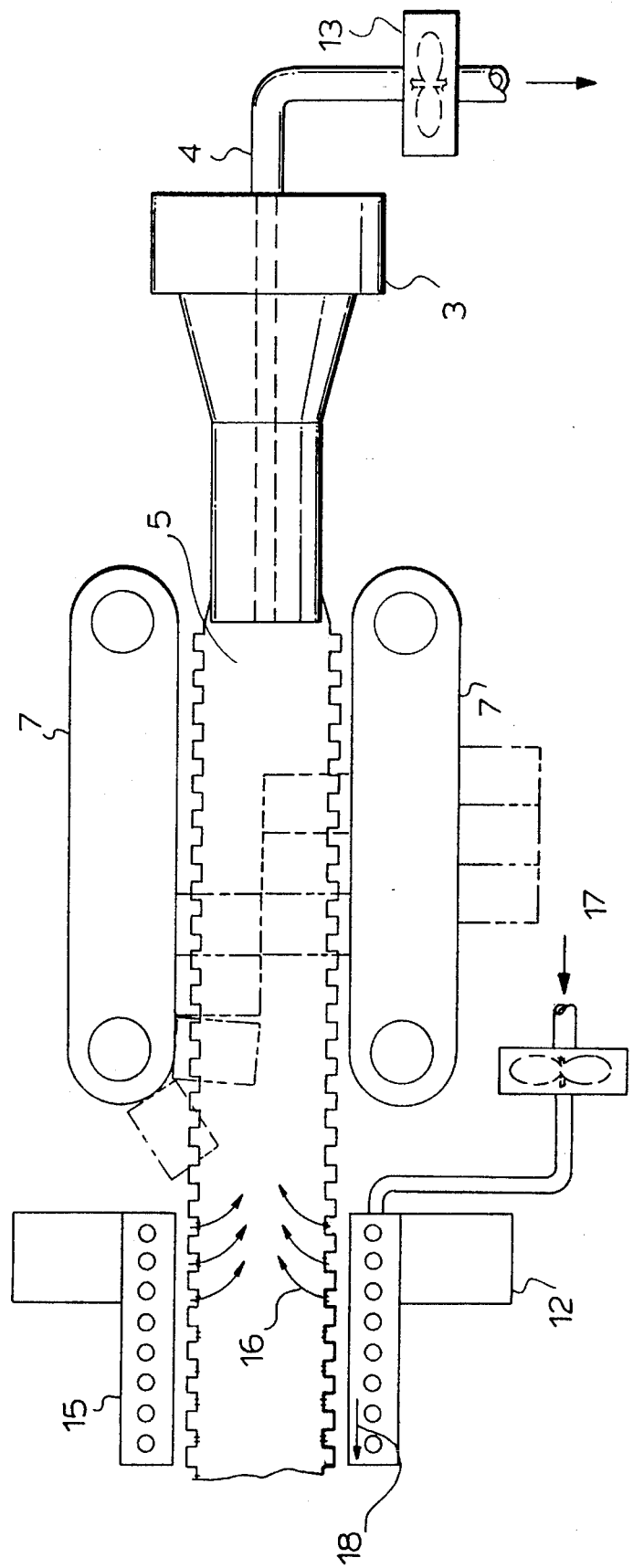
FIG. 2 is a view similar to FIG. 1 showing the molding apparatus with additional cooling features.

What also should be noted in FIG. 2 is that some of the cooling air as indicated at arrow 18 under the influence of the positive pressure created by blower 17 can also be directed downstream with the pipe past the perforator to provide additional cooling on the pipe itself before it finally leaves the molding apparatus.

Figure 3:
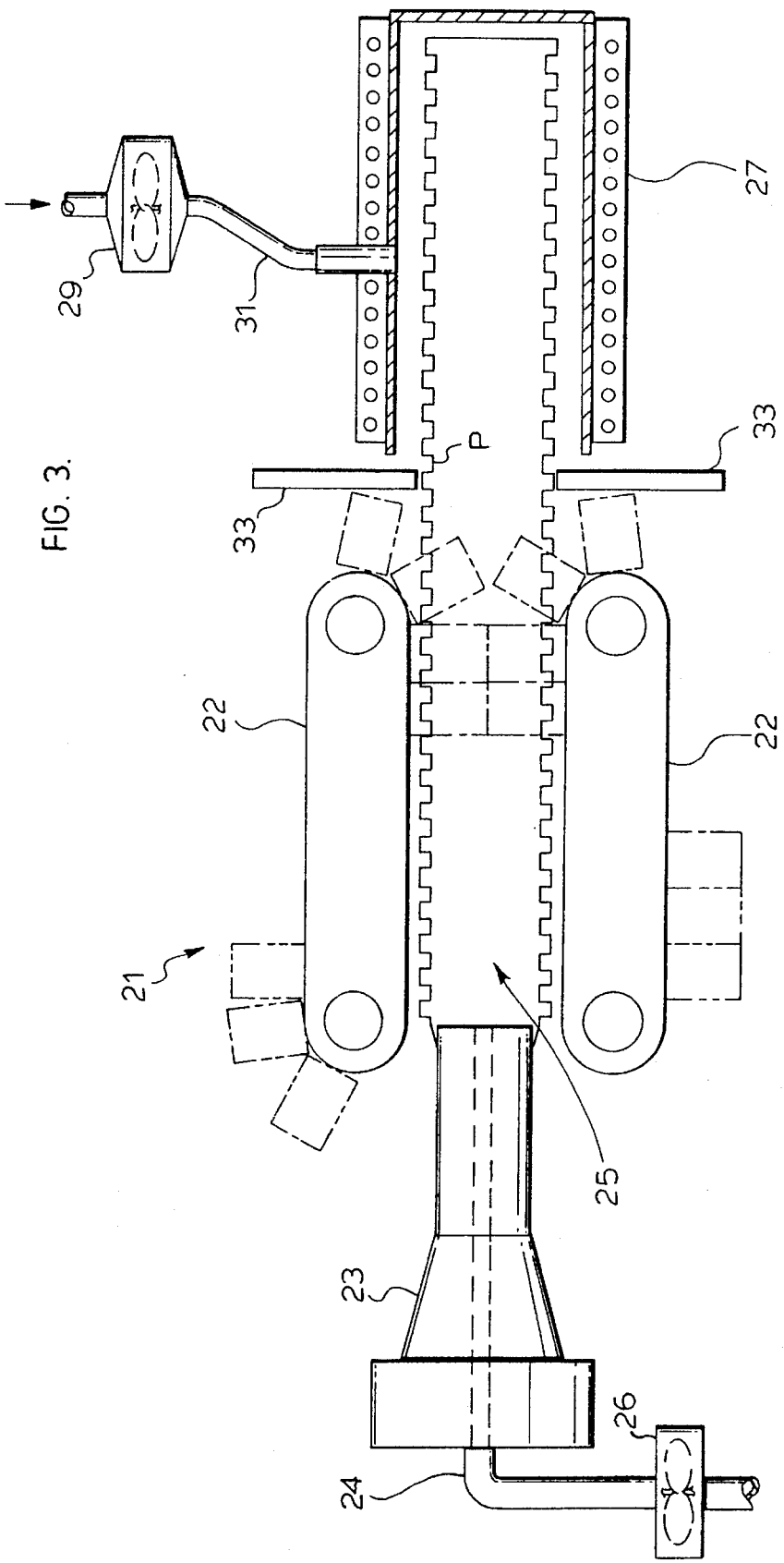
FIG. 3 is a general view of a further preferred embodiment molding apparatus with cooling features.
Figure 4:
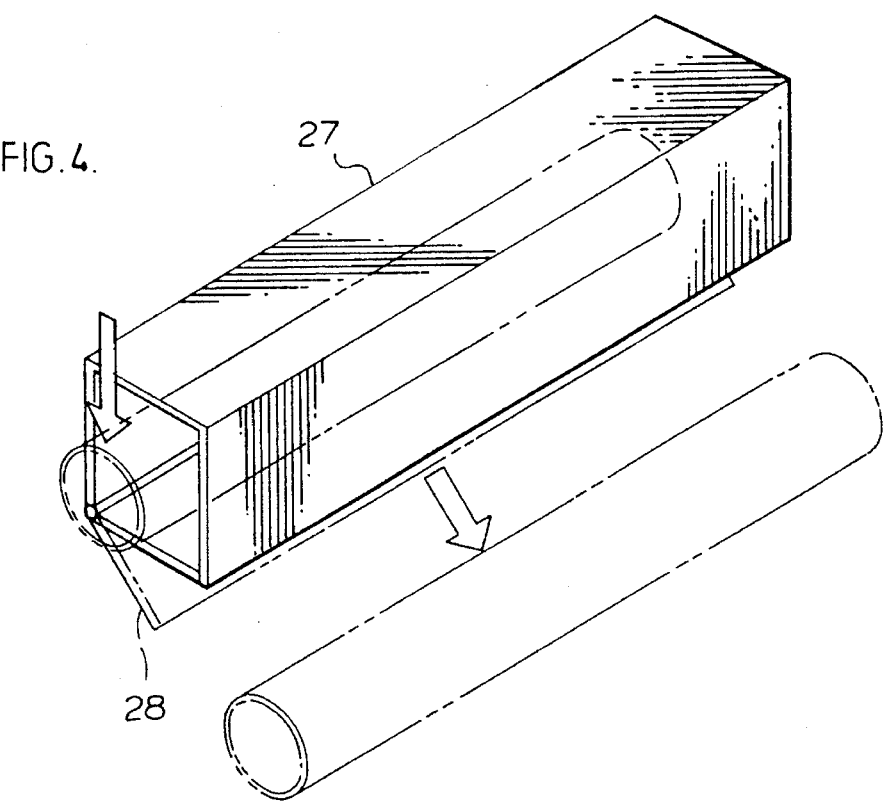
FIG. 4 is a perspective view of the end containment chamber from the molding apparatus of FIG. 3.

FIG. 3 shows a molding apparatus generally indicated at 21 having an upstream die 23 which extrudes into a mold tunnel 25 defined by mold block sections on opposing tracks 22. A blower 26 creates a negative pressure within the mold tunnel through the die passage 24.

Provided at the downstream end of molding apparatus 21 is a cooling chamber 27. Also provided is a pipe cutter 33. The pipe P after being shaped in the mold tunnel is moved past the cutter into the cooling chamber 27. Positive air pressure is introduced to the cooling chamber by blower 29 which feeds to the interior of the cooling chamber through passage 31.

In this particular case, the cooling gas is in the form of air cooled within the cooling chamber 27. This cooled air is moved through the open end of the pipe in an upstream direction through the molding apparatus by both the negative air pressure created by the suction side of blower 26 and the positive air pressure provided by blower 29.

This particular embodiment also includes the feature that as soon as a specific length of pipe is pushed into the cooling chamber which would typically be the length of the cooling chamber itself, then cutter 33 operates to cut off the length of pipe contained within the cooling chamber. In order to release the now cut pipe section, chamber 27 is provided with a releasable bottom door 28 which opens to drop the pipe section to some type of a take away system not shown in the drawing. Door 28 is then moved back up to its closed position for the cooling chamber to accept the next length of pipe which is pushed into it from the mold apparatus.

When working with the combination cooling chamber and cutter, the two are sealed against one another to prevent air leakage from the chamber and to ensure that the cooling air is directed back up into the molding apparatus through the pipe.

This particular embodiment is useable with both non-perforated pipe where the air would enter through the end of the pipe and perforated pipe in which the cooled air would additionally enter through the perforations in the pipe wall.

Figure 5:
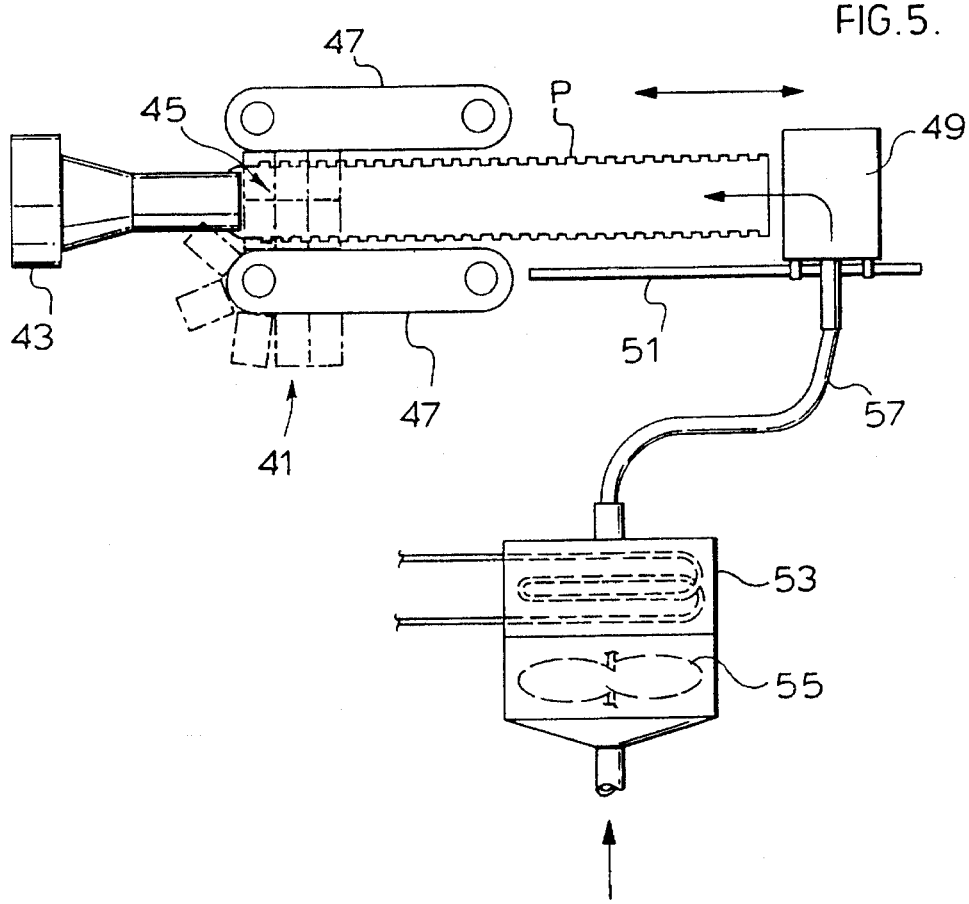
FIG. 5 is a general view of a molding apparatus with cooling features specifically for a solid wall pipe.

FIG. 5 shows a molding apparatus generally indicated at 41 specifically designed to form and cool a non-perforated pipe P. This apparatus includes an upstream end die 43 which extrudes molten thermoplastic material into a mold tunnel 45 defined by mold block tracks 47. Once again, the die and die tooling is cooled by moving a cooling gas from the downstream end towards the upstream end of the apparatus. However, in this particular case pipe P after leaving the mold tunnel immediately abuts an end stop 49. This end stop is slideable along a support plate 51 so that it continues to move with the pipe as the pipe is fed from the molding apparatus.

End stop 49 is fed cooling air from a cooling chamber 53 along a passage 57. A blower 55 at the cooling chamber provides positive air pressure to ensure that the cooled air is forced upwardly through the pipe P and back into the molding apparatus as shown in FIG. 5 of the drawings.

Once a sufficient length of pipe has been moved out of the molding apparatus, it is cut and the end stop 49 returned to a position directly at the end of the mold tunnel to receive further pipe which is again cooled by the air fed from the end stop back into the pipe.

Figure 6:
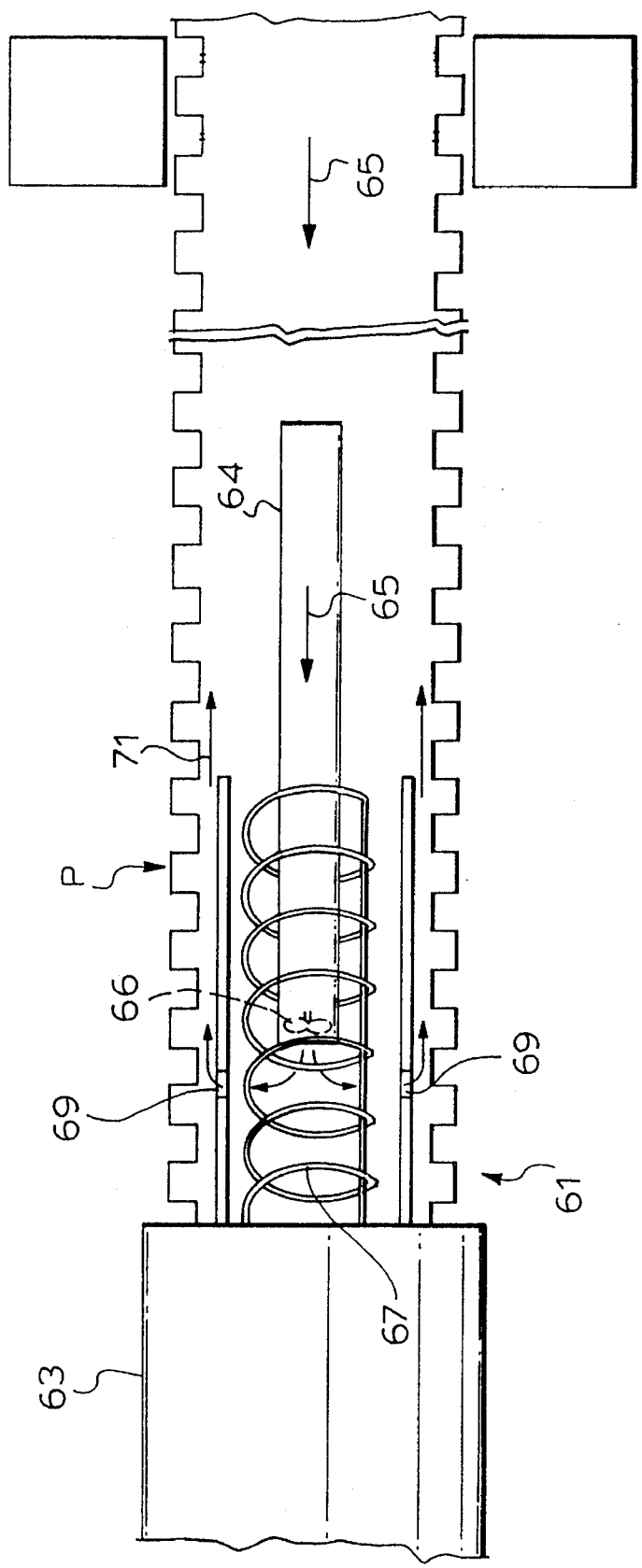
FIG. 6 is a sectional view through the die and molding tunnel of a molding apparatus showing internal cooling features according to a further preferred embodiment of the present invention.

FIG. 6 of the drawings shows the die and mold tunnel from a molding apparatus generally indicated at 61 particularly suited for extruding double wall pipe. This particular apparatus includes a die 63 which extrudes to a downstream mold tunnel defined by mold block sections as earlier described to form a pipe P. In this particular case, cooling plug 67 is located within the mold tunnel inside of the pipe as shown. This cooling plug is located in an upstream region of the tunnel near the die.

Located in the center of the mold tunnel is an elongated hollow shaft 64 which extends towards the downstream end of the molding apparatus. A blower 66 is provided near the upstream end of shaft 64 and draws air from the downstream end of the shaft.

In molding apparatus 61, the cooling plug rather than being used in its normal cooling function as is known in the art, is used to provide a heat exchange for gas once again drawn from the downstream towards the upstream end of the molding apparatus. More particularly, the suction side of blower 66 draws cooling gases 65 upstream through shaft 64 to the cooling plug. Gases 65 can either be ambient air, cooled air or a combination of both.

Once the cooling gases 65 have reached the cooling plug 67, they have lost much of their cooling capacity due to the heat energy that they have taken on while coming upstream through the mold tunnel. The cooling plug then acts as a heat exchanger to re-cool the gases. However, it is not desirable to continue to move the re-cooled gas towards the die but rather they are redirected back downstream through plug openings 69 as cooled gases 71 which feed forced against the inside of the pipe wall as shown in FIG. 6 of the drawings. The cooled gases 71 are sufficiently downstream of the die and die tooling such that they do not adversely affect performance in this area but rather give added cooling on the pipe wall before it leaves the molding apparatus enhancing stability and output speeds of the mold.

It will now be understood from the description above how cooling is provided internally of a molding apparatus by drawing cooling gas which can be either in the form of ambient air, cooled air or a combination of both from the downstream rather than the upstream end of a molding apparatus. This ensures that the cooling gas does not have to pass through the die and die tooling but rather is moved in a direction reverse to that of the flow of thermoplastic material in the molding apparatus. Therefore, the cooling air has little or no effect on the molding apparatus in the region where it is desired to maintain high temperatures but rather works in cooling the mold apparatus where it is most needed towards its output end.

Also, it should be noted that although the detailed description above is specific to pipe molding, the method is equally applicable to other types of hollow profiles formed on molds having upstream heated extruders and regions for cooling and shaping the profile downstream of the heated extruder.

Although various preferred embodiments of the present invention have been described herein in detail, it will be appreciated by those skilled in the art, that variations may be made without departing from the spirit of the invention or the scope of the appended claims.

The embodiments of the invention in which an exclusive property or privilege is claimed are defined as follows:

1. A method of forming hollow product in a molding apparatus having an upstream and a downstream end, said method comprising extruding a parison of thermoplastics material in a molten state from a heated extruder at the upstream end of the apparatus into a product shaping region located downstream of the extruder in the apparatus, moving the material through the product shaping region towards the downstream end of said apparatus, cooling the material by a cooling medium moved under pressure through said molding apparatus internally of the product from the downstream end towards the upstream end of said apparatus.

2. A method as claimed in claim 1, wherein the cooling medium is provided by moving outside ambient air into said molding apparatus.

3. A method as claimed in claim 1, including cooling air in an air cooling device and moving the air from said cooling device into said molding apparatus.

4. A method as claimed in claim 1, wherein the cooling medium is provided by moving a combination of outside ambient air and cooled air from a cooling device into said molding apparatus.

5. A method as claimed in claim 1, wherein the cooling medium is drawn into said molding apparatus by negative air pressure created at said upstream end of said apparatus.

6. A method as claimed in claim 1, wherein the cooling medium comprise air forced into said molding apparatus by positive air pressure at said downstream end of said molding apparatus.

7. A method as claimed in claim 1 used in forming hollow pipe and including forming perforations in the pipe at the downstream end of said apparatus and drawing the cooling gas through the perforations.

8. A method as claimed in claim 3, used in forming pipe with a solid wall having an open end and the open end of the pipe is forced onto said cooling device which then moves with the pipe as the pipe leaves the mold apparatus.

9. A method as claimed in claim 3, used in forming pipe and wherein said cooling device comprises a cooling chamber and said method includes moving the pipe out of the shaping region into the cooling chamber which completely surrounds and forces the cooling air into the molding apparatus through the pipe.

10. A molding apparatus for forming pipe, said molding apparatus having an upstream end provided with a die which is heated to extrude a parison of thermoplastics material in a molten state into a mold tunnel in which the pipe is shaped and having a downstream end from which the pipe leaves said mold tunnel, and pressurizing means which acts on a cooling medium supplied at said downstream end and moved towards said upstream end of said apparatus by said pressurizing means to internally cool said apparatus.

11. A molding apparatus for forming pipe, said molding apparatus having an upstream end provided with a die which is heated to extrude a parison of thermoplastics material in a molten state into a mold tunnel in which the pipe is shaped and having a downstream end from which the pipe leaves said mold tunnel, said molding apparatus including at least a first blower having a blower output which is directed interiorly of said mold tunnel and which moves cooling gas interiorly through said apparatus from said downstream end towards said upstream end thereof.

12. A molding apparatus as claimed in claim 11, wherein said first blower is located at said upstream end and draws the cooling gas from said downstream end of said apparatus.

13. A molding apparatus as claimed in claim 11, wherein said first blower is located at said downstream end and pushes the cooling gas towards said upstream end of said apparatus.

14. A molding apparatus as claimed in claim 11, wherein said first blower is located at said upstream end and draws the cooling gas from said downstream end of said molding apparatus and including a second blower at said downstream end which pushes the cooling gas from said downstream end towards said upstream end of said molding apparatus.

15. A molding apparatus as claimed in claim 11, wherein said downstream end of said apparatus is open to ambient air to provide the cooling gas.

16. A molding apparatus as claimed in claim 12 including a cooling device at said downstream end of said apparatus from which said cooling gas is moved into said molding apparatus.

17. A molding apparatus as claimed in claim 11, including a cooling member internally of said mold tunnel and a cooling gas reverse path arranged relative to said cooling member such that the cooling gas after moving from said downstream end of said apparatus is cooled by heat exchange from the cooling member and then redirected by said cooling gas reverse path to move with the thermoplastics material back towards said downstream end away from said die.

18. A molding apparatus as claimed in claim 16, wherein said cooling device comprises a cooling chamber into which the pipe is moved from said apparatus.

19. A mold apparatus as claimed in claim 18, including a pipe cutter between said mold tunnel and said cooling chamber and wherein said cooling chamber includes a bottom door for releasing the pipe from said cooling chamber.

20. A molding apparatus as claimed in claim 16, including a moving pipe end stop which directs the cooling gas into the pipe.

21. A molding apparatus for forming a hollow profile, said molding apparatus having an upstream end provided with an extruder which is heated to extrude a parison of thermoplastics material in a molten state into a profile shaping region of said apparatus, said apparatus further having a downstream end from which the profile leaves said shaping region, said apparatus further including means which provides air pressure in said profile shaping region and said apparatus being cooled interiorly by a cooling gas moved by the air pressure through the product in said profile shaping region from said downstream end and moved towards said upstream end of said apparatus and an exhaust region for exhausting the cooling gas from said apparatus.

* * * * *